Figure 3:
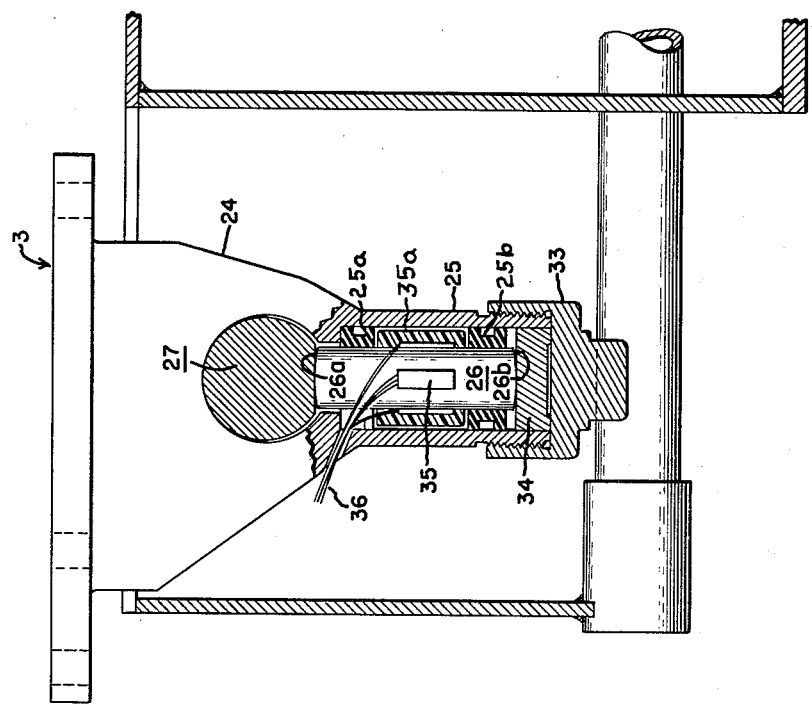

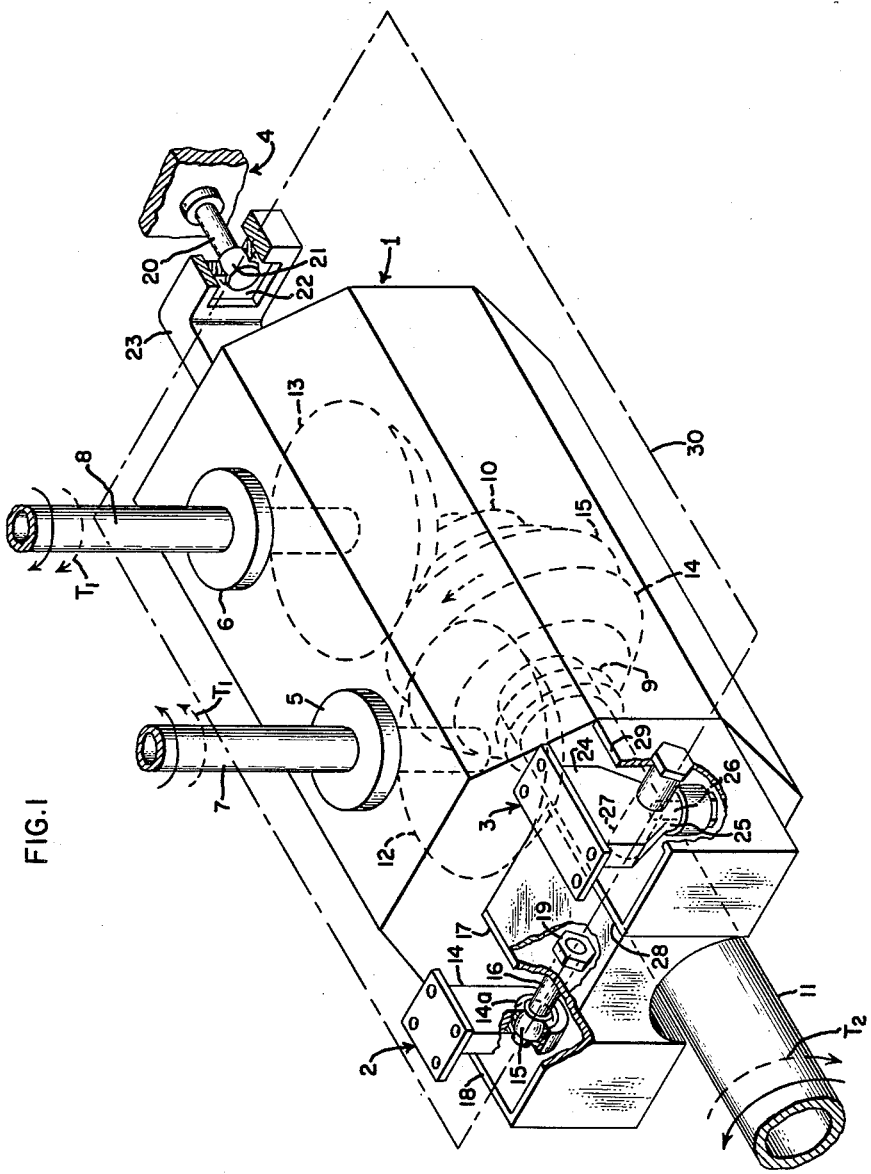

March 16, 1965 P. H. DIEHL ETAL 3,173,292

TORQUE-MEASURING ARRANGEMENT

Filed May 6, 1963 4 Sheets-Sheet 3

INVENTORS:
PAUL H. DIEHL,
HENRY SORENSEN,

BY *W. C. Crutcher*

THEIR ATTORNEY.

INVENTORS:
PAUL H. DIEHL,
HENRY SORENSEN,

BY W. C. Crutcher
THEIR ATTORNEY.

United States Patent Office 3,173,292
Patented Mar. 16, 1965

3,173,292
TORQUE-MEASURING ARRANGEMENT
Paul H. Diehl, Georgetown, and Henry Sorensen, Marblehead, Mass., assignors to General Electric Company, a corporation of New York
Filed May 6, 1963, Ser. No. 278,357
10 Claims. (Cl. 73—136)

This invention relates to an improved torque sensor, which is incorporated in the mounting of a torque conversion unit such as a gear box. More particularly, the invention relates to a torque sensor, which provides improved accuracy in indicating torque transmitted by one or more rotating shafts entering or leaving a torque conversion unit, which is held in three universal supports relative to a fixed structure.

The term torque conversion unit as used herein means any sort of casing or frame carrying the bearings of torque-transmitting shafts, which are mechanically coupled together in the casing for the purpose of torque conversion. The mechanical coupling may consist of gears, clutches, chain drives, friction drives and various known means to couple rotating shafts. Such torque conversion units may be employed to change the direction of torque, as exemplified by right angle drives or reversing gearing, or may be employed to provide a selected ratio between speeds or torques of input and output shafts, as exemplified by a speed reduciton unit. The most common example of a torque conversion unit is a gear box, which holds the bearings for shafts turning meshed gears contained within the gear box.

It is known that a torque conversion unit, such as a gear box, can be supported in a universal three-point mounting, i.e., held at three spaced locations by three universal connections. The purpose of the three-point mounting is to provide a non-redundant support, so that external forces and moments not related to or created by the torque transmitted through the torque conversion unit, applied either through the shafts or from the supporting structure, will not introduce deflections into the structure of the torque-conversion unit.

It is also known that a torque-conversion unit will "feel" reaction torques which are proportional to the torques on the shafts entering or leaving the torque-conversion unit. These reaction torques will set up reaction forces and reaction couples in the mounting, which may have components in all three planes. Any attempt to ascertain torque of a particular shaft by measuring these reaction forces will generally be confounded due to the friction forces introduced in the mountings and due to the indeterminate nature of the equation defining the forces and reactions. For example, considering a torque-conversion unit as a "free body," and neglecting reaction couples in the small universal connectors, it will generally be found that there are still nine unknowns, i.e., reaction force components in three mutually perpendicular directions at each of the three mounts. Although only one of these force components is desired to be measured, i.e. a reaction force which is exerted at a right angle to a radial line from the shaft for which torque is to be computed, there is usually insufficient information available to solve for the nine unknown quantities. Also, in the usual case, reaction force components will be set up in other directions and in other mounts, and cause the selected reaction force component to be an untrue indication of torque. The present invention provides an arrangement for a three-point support which removes the aforementioned difficulties.

Accordingly, one object of the invention is to provide an improved torque sensor for the mounting of a torque conversion unit.

Another object of the invention is to provide an improved torque sensor, which is accurately responsive to the torque of a rotating shaft entering or leaving a torque conversion unit.

Another object of the invention is to provide an improved arrangement for a three-point support, which incorporates a torque-sensing device.

Still another object of the invention is to provide an improved arrangement for sensing the torque transmitted by one or more shafts entering or leaving a gear box supported on a three-point universal support.

The subject matter which is regarded as the invention is particularly pointed out and distinctly claimed in the concluding portion of this specification. The invention, however, both as to organization and the method of practice, together with further objects and advantages thereof, may best be understood by reference to the following description, taken in connection with the accompanying drawings in which:

FIG. 1 is a simplified perspective view of a gear box having two parallel oppositely rotating input shafts and a single output shaft for a right angle drive.

Figure 2:
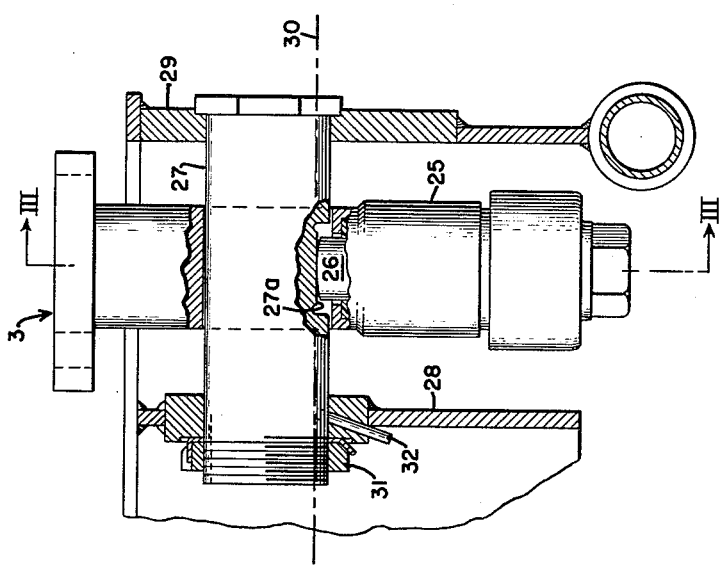
Figure 4:
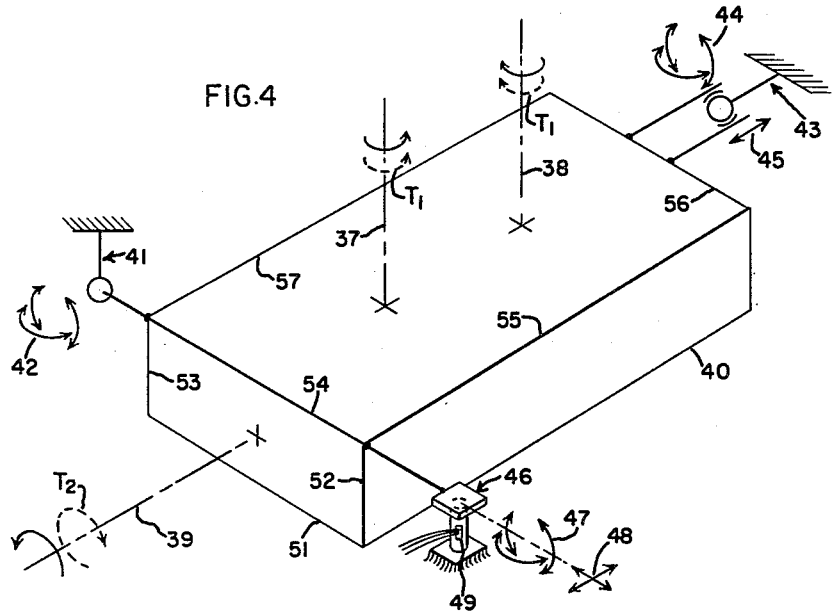
Figure 5:
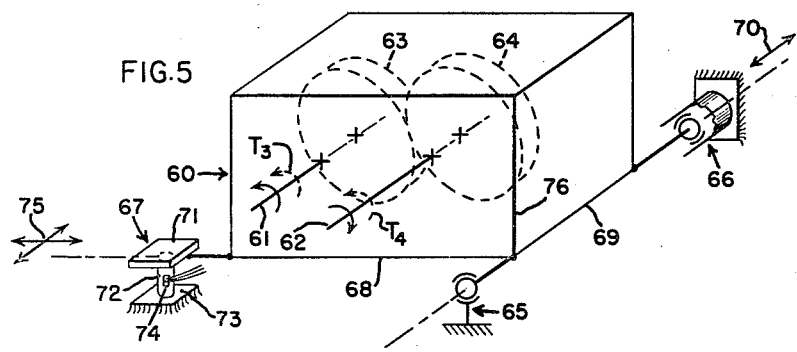
Figure 6:
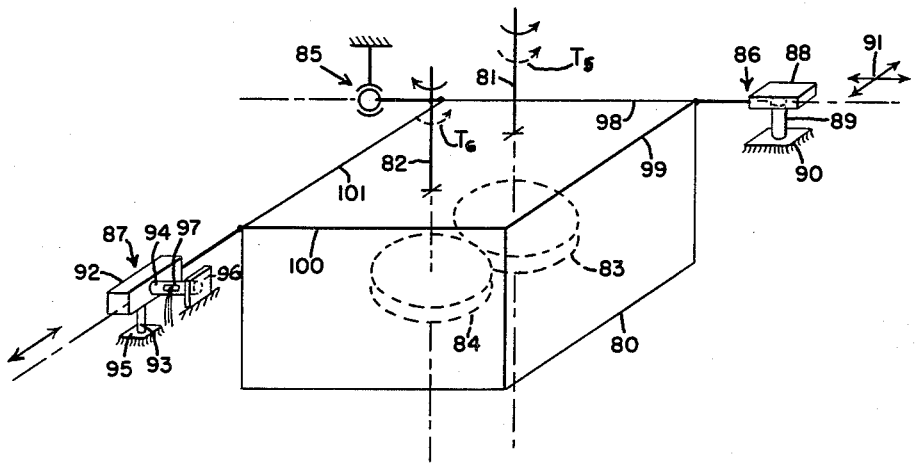
Figure 7:
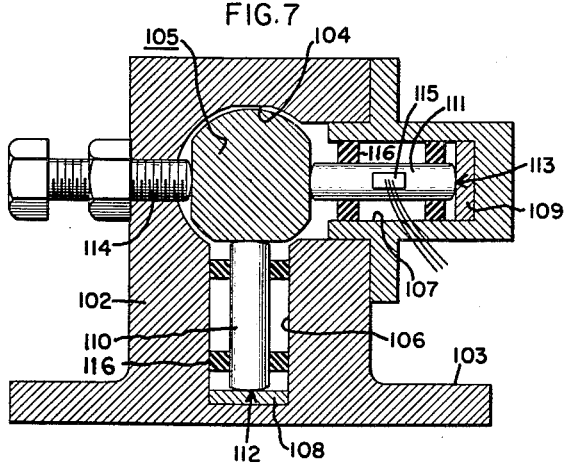

FIG. 2 is an enlarged detail view, partly in section, of the torque-sensing mount of FIG. 1, looking axially in the direction of the output shaft, FIG. 3 is a similar enlarged view, partly in section, taken along lines III—III of FIG. 2, FIG. 4 is a still further simplified representation of the gear box of FIG. 1, shown in perspective, with the mounting in generalized form, FIG. 5 is a simplified perspective view of another type of gear box, FIG. 6 is still another modification shown in simplified perspective form, and FIG. 7 is a cross-sectional view of the torque-sensing mount of FIG. 6 as it would appear in a practical form.

Briefly stated, the invention is practiced by locating the three universal mounts supporting the gear box in a common plane, which is oriented with respect to the shaft or shafts in which torque is to be measured, so that a force-responsive element in one of the mounts will sense a single reaction force, which is accurately proportional to the torque to be measured.

Referring now to FIG. 1 of the drawing, a gear box, shown generally as 1, is supported in three mounting brackets 2, 3, 4 affixed to a stationary supporting structure (not shown). The gear box includes conventional bearings 5, 6 rotatably journaling two vertical parallel input shafts 7, 8 rotating in opposite directions, as indicated by the solid arrows. The gear box also includes bearings 9, 10 rotatably journaling a perpendicular output shaft 11, rotating in the direction indicated by the solid arrow.

Shafts 7, 8 are mechanically coupled to transmit torque to driven shaft 11, as well as changing the direction of the driven shaft by means of bevel gears 12, 13 meshed with opposed bevel gears 14, 15 respectively.

The arrangement shown is merely illustrative of the use of the invention in the gear box of FIG. 1 and is not limited to this type of gear box. However, it will be noted, as more particularly described in U.S. Patent 3,111,111 issued November 19, 1963 to R. W. Willis, Jr., and assigned to the assignee of the present application, that, due to the arrangement of the gears, certain reaction forces and torques are cancelled. Specially, in the special case described in Patent No. 3,111,111, the input torques $T_1$, designated by the dotted arrows, are equal and opposite and hence balance one another and are therefore not communicated to the mountings. In a similar manner, the axial thrusts on opposed gears 14, 15 (caused by the bevel gears 12, 13) are equal and opposite and hence are not communicted to the mountings.

It is desired here to accurately measure the output torque furnished by shaft 11 while it is rotating. This output torque is equal and opposite to a reaction torque, shown by dotted arrow $T_2$ (opposite the direction of rotation of shaft 11), which is imposed on the gear box 1 and communicated to mounts 2, 3, 4.

The mounting brackets 2, 3, 4, which will be described in detail, are alike in that they each provide limited rocking motion between the gear box and the supporting structure about the point of support in a universal-type connection; they are different in that they provide varying degrees of translatory movement of gear box 1, and in that mount 3 is a special torque-sensing mount.

Mount 2 includes a fixed vertical support member 14 carrying a spherical-surfaced socket 14a, in which is disposed a ball 15 attached to a horizontal stub 16. Stub 16 is affixed between walls 17, 18 of gear box 1 by nuts, one of which is seen at 19. Thus mount 2 provides limited rotary movement around three mutually perpendicular axes, but no translatory movement of the gear box along these axes.

The mounting bracket 4 carries a horizontally extending stub 20 upon which is mounted a ball member 21. Ball 21 is disposed in a spherically-surfaced socket 22 which, in turn, is disposed within a bracket 23 attached to gear box 1. Socket 22 is axially slidable within bracket 23 so that, in addition to the universal rotary movement provided by the ball-and-socket, unidirectional translatory movement along the axis of stub 20 is also obtained. Stub 20 is oriented parallel to the axis of output shaft 11.

Mounting bracket 3 includes a fixed vertical support member 24, having a hollow cylindrical extension 25 on the lower end thereof. A vertical pin 26 is disposed within cylindrical member 25 and supports on its upper end the flattened underside of a stub 27. Stub 27 is affixed between walls 28, 29 of gear box 2 in the same manner as was stub 16 of mount 2.

It is of particular importance to note that the center of rotation of balls 15, 21 and the point of contact between pin 26 and stub 27 all lie in a common plane designated by dot-dash line 30. As will be explained further in connection with FIGS. 2 and 3, bracket 3 provides universal rotary movement, as well as freedom of limited translatory movement in any direction in plane 30. Mount 3 is also arranged to sense a reaction force.

Referring to FIGS. 2 and 3 of the drawing, the actual details of mount 3, which are simplified in FIG. 1, will become apparent. Stub 27 is cylindrical and is secured between walls 28, 29 by means of a nut 31 threaded to its end. After alignment, it is locked in position by means of a pin 32. A flat bearing surface 27a is cut in its underside. Surface 27a acts as the point of support for the gear box on top of pin 26. It will be observed that the plane 30 passes through the point of contact between surface 27a and pin 26.

Referring to FIG. 3, the hollow cylindrical extension 25 on the lower end of member 24 is threaded to receive a cap 33 and to hold a flat bearing disk 34. It should be particularly observed that the upper and lower ends 26a, 26b respectively of pin 26 are provided with a spherical surface to allow limited rocking of pin 26 on the flat surfaces of members 34, 27. Upper surface 26a provides universal limited rocking movement of stub 27 relative to the plane 30. Limited translatory movement in plane 30 is provided, for all practical purposes, by rocking of pin 26 on its lower surface 26b. Thus, within the small degrees of movement contemplated (perhaps only $\frac{1}{32}''$ of translation with a pin 26 on the order of $3''$ long), translatory movement of stub 27 in plane 30 is provided without sliding friction. This is accomplished by a pivoting or lever-like movement of pin 26 which, at small angles of pivoting, very closely approximates pure translatory movement.

Pin 26 is provided with means to measure the force of compression transmitted from its surface 26a to 26b. Various means are known in the art for accomplishing this result, but as shown here, a suitable strain gage bridge, of which one of the gauge is shown at 35, is located on the cylindrical surface of pin 26 and is connected to a voltmeter and power source (not shown) by leads 36. The strain gages are enclosed in a "potting" compound 35a for protection. Readily compressible rubber bushings 25a, 25b serve to center the pin 26 initially in housing 25, without substantially inhibiting the limited rocking motion of pin 26 on plate 34.

The details of the strain gage bridge are immaterial to the present invention, but as is well known can consist of bridge-connected resistors so disposed on the surface of a member as to provide a resistance proportional to deflection. The bridge is provided with a source of energy and the voltage across the balance arms is read on a voltmeter (not shown). The meter would be calibrated to read torque directly, by relating a strain and force measurement to the moment arm at which it is applied, after first deducting a tare force corresponding to the portion of normal weight of the gear box 1 carried by pin 26. The plane in which the torque has to be determined is, of course, the plane of rotation of the shaft, i.e. a plane normal to the axis of the shaft producing the reaction torque.

The operation of the improved torque sensing arrangement will be made clearer by reference to the even more simplified view of FIG. 4, which is a "free body" representation of the gear box of FIG. 1. The mounting supports have been shown in very simplified form and the torque transmitting means inside the gear box have not been shown. The two axes of the input shafts are indicated by centerlines 37, 38 and the axis of the output shaft by centerline 39 intersecting box 40.

A support 41, corresponding to mounting bracket 2, provides rotary motion in three mutually perpendicular planes as indicated by arrows 42, but provides no translatory motion. Bracket 43, corresponding to mounting bracket 4 of FIG. 1, allows similar universal rotary movement, as indicated by arrows 44, and in addition provides one degree of sliding translatory motion, as indicated by arrow 45. Mount 46, corresponding to the torque-sensing mounting bracket 3, provides similar universal rotary movement as indicated by arrows 47 and, in addition, provides two degrees of translatory movement as indicated by arrows 48. The reaction couples produced by universal rotary movement (arrows 42, 44, 47) at the three mounts are small and will be neglected.

A strain gage measuring a reaction force component at mount 46 is indicated at 49. This component, which is in a downward direction along the pin, indicate the reactive torque $T_2$, which, in turn, is equal and opposite to the output torque of shaft 11, in FIG. 1.

It will be observed that the torque $T_2$ takes place in a plane hereinafter designated as the "bearing plane" and designated by the sides of the box 51, 52, 53, 54. This is the plane of rotation of shaft 39, designated the "bearing plane," in order to indicate that it is a plane parallel to the several planes actually containing the bearings of the shaft under consideration, i.e. normal to the axis of shaft 39, and hence combined reaction torques of the output shaft bearings can be measured in it.

As was mentioned previously, the universal mounts lie in a common plane designated by the edges of box 40 indicated as 54, 55, 56, 57. This is hereinafter designated the "mounting plane," because of the fact that the three mounts are disposed therein. It will also be observed that limited unidirectional translatory movement of box 40 can take place in the "mounting plane" at mount 43 and that limited translatory movement in any direction in the mounting plane can take place at mount 46. Mount 41, however, is fixed and allows no translatory movement.

In the case shown in FIGS. 1 and 4, the mounting plane is perpendicular to the bearing plane, and reaction torque $T_2$ will create a motion of the mounting plane in the direction of $T_2$ to produce a downward force on the pin in mount 46, which is proportional to torque $T_2$. Due to the specific types of translatory motion provided by the separate mounts in the mounting plane and due to the orientation of the mounting plane with respect to the bearing plane, extraneous reaction forces which might tend to give a false torque reading will be removed or nullified so that strain gage 49 can give a true indication of torque $T_2$. For example, the sliding friction force produced by a transverse reaction force on mounting 43 is parallel to the output shaft and will therefore not affect torque $T_2$.

FIG. 5 shows a modification of the invention. A gear box, represented by box 60, serves as a torque-conversion unit in which the input shaft, represented by line 61, is coupled to an output shaft, represented by line 62, by means of the gears 63, 64. It will be understood that gears 63, 64 are representative of any type of torsional coupling. However, box 60 is referred to hereinafter as a gear box simply for convenience. The rotation of shafts 61, 62 is as indicated by the solid arrows. The reaction torques of the input and output shafts on the gear box are represented by dotted arrows $T_3$ and $T_4$ respectively. Output torque $T_4$ is opposite the direction of rotation. Mounting brackets 65, 66, 67 support gear box 60 and are disposed in a common "mounting plane" represented by the lower surface of box 60 bounded by the two edges 68, 69.

Mount 65 is a fixed ball-and-socket joint, which provides universal rotary movement, but no translatory motion in any direction. Mount 66 is a ball-and-socket joint, which is slidable parallel to the axes of shafts 61, 62 to provide one degree of translatory motion, as indicated by arrow 70. Mounting 67 comprises, in symbolic form, a supporting plate 71 resting on a pin 72 which in turn rests on a base 73. Pin 72 has spherical end surfaces, and is provided with a reaction force measuring device, such as strain gage 74. As before, the mount 67 provides limited universal rocking or rotary motion at the top spherical surface of pin 72 and also provides translatory movement with two degrees of freedom by rocking of pin 72 on its lower surface, as indicated by the arrows 75. The reactive torques $T_3$ and $T_4$ act in a "bearing plane" designated by the front face of the box bounded by lines 68, 76, i.e., a plane parallel to the planes of rotation of shafts 61, 62. Hence pin 72 will measure a reactive force due to the cumulative effect of torques $T_3$ and $T_4$. Since there are two unknowns, it is also necessary to apply the relationship between torques $T_3$ and $T_4$ which is known due to the ratio of teeth in gears 63, 64. By suitable calibration of the indicator giving the force sensed by strain gage 74, either the torque of input shaft 61 or the torque of output shaft 62 can be measured and read continuously. As before, the bearing plane and the mounting plane are perpendicular to one another.

FIG. 6 illustrates another modification of the invention. Here the "bearing plane" and "mounting plane" are either parallel or common rather than perpendicular to one another. The gear box, indicated generally as 80, has an input shaft 81 and an output shaft 82 coupled by members such as gears 83, 84 respectively. Shaft rotations are indicated by the solid arrows while the reactive torques of shafts 81, 82 on box 80 are indicated by dotted arrows $T_5$ and $T_6$ respectively. Box 80 is carried in three universal mountings 85, 86, 87. Mount 85 is a ball-and-socket type support allowing no translatory motion. Mount 86 is represented by means of a support plate 88 affixed to box 80 and resting on a spherically-ended pin 89, which in turn rests on a flat support 90. Mount 86 allows limited universal rotary motion and also two degrees of translatory motion, as represented by arrows 91. Contrary to the previous arrangements, torque sensing is not carried out in the mount 86 with its two degrees of translatory motion, but instead is accomplished in mounting 87 which permits only one degree of translatory motion. Mounting 87 is represented by means of a flat-sided block 92 affixed to box 80 and contacting two mutually perpendicular spherically-ended pins 93, 94. It will be understood that additional restraining members will be necessary in a practical mounting, but these are not shown in FIG. 6 (see FIG. 7) as they would only tend to obscure the function of mounting 87. Pins 93, 94 bear against stationary mounting surfaces 95, 96 respectively. Pin 94 carries a reaction-force-responsive element such as strain gage 97.

It will be observed that in FIG. 6, the mounting plane (containing mounts 85, 86, 87) and the bearing plane, the plane of rotation of shafts 81, 82 are one and the same, this plane being designated by lines 98, 99, 100, 101.

Reaction torques $T_5$ and $T_6$ combine to rotate box 80 counterclockwise (looking downward on the box), and the reaction force of block 92 pressing horizontally against pin 94 is measured by strain gage 97. Since the ratio of torques $T_5$ and $T_6$ is known, the strain indicator (not shown) can be calibrated to read either the input or output torque being transmitted.

A practical form of the mounting 87 is shown in FIG. 7 of the drawings. There a housing 102, attached by flanges 103 to a stationary member (not shown), has a central aperture 104 through which extends a stub 105 (comparable to block 92 of FIG. 6 and suitably attached to the gear box). Housing 102 is arranged to provide additional cavities 106, 107 with flat bearing plates 108, 109 respectively. Pins 110, 111, having spherical ends as before, allow limited universal rocking or rotary motion of stub 105 and also pivot at points 112, 113 to allow limited relatively frictionless rolling translation of stub 105 into and out of the plane of the drawing. Retention of stub 105 upon reversal of normal forces is provided by means of adjustable stud 114 and the top of cavity 104. The strain gage element 115 is affixed to pin 111 to indicate the reaction force on the housing 102 along a horizontal axis. As before, pins 110, 111 are aligned by means of readily compressible soft rubber bushings 116. These bushings do not substantially restrain rocking movements of the pins.

An analysis of the foregoing mounts shows that in mounts of the type shown in FIGS. 1–5, removal or nullification of undesired reaction forces is provided by means of the relatively frictionless translatory movement of the spherically-ended torque-sensing pin, while any sliding friction forces in the other mounts are nullified by placing the three mounts in a plane perpendicular to the bearing plane.

In the mounts of the type shown in FIGS. 6 and 7, the use of the special pin mounts for two of the mounts eliminates sliding friction forces in the bearing plane for all practical purposes. In this case, the "bearing plane" and "mounting plane" are either parallel or coincident.

It will be observed that it is immaterial as to what sort of mechanical torque transmission means between the rotating input and output shafts is employed, since the torque conversion or torque generating unit can be considered as a "free body" feeling reaction torques at its bearings, regardless of what is inside the unit. It will also be observed that the invention allows either input or output torque to be continuously sensed by the disclosed arrangement of the mounting and by reading an instrument measuring a single reactive force in one of the mounts.

The location of the mounts in a common plane properly oriented and providing translatory movement, and the selected use of the spherically-ended pins to provide relatively frictionless translatory movement reduces or nullifies extraneous reactive forces which would otherwise distort the measurement of torque.

While there has been described herein what is considered to be the preferred embodiment of the invention, with several modifications thereof, it is intended to cover

What we claim as new and desired to secure by Letters Patent of the United States, is:

1. A torque-sensing, torque-conversion unit comprising:
   a casing having bearing means disposed therein,
   first and second rotating shaft members mechanically coupled inside said casing for transmission or torque therebetween, the first shaft being journalled in said bearing means for rotation about an axis normal to a first plane,
   three support members carrying said casing in universal mountings, said mountings all lying in a second plane, two of said members being constructed to allow limited translatory movement of the casing in the second plane, one of said mountings including a resisting member for resisting the tendency of rotation of the casing in the first plane in response to rotation of said first shaft member relative to said casing, and
   force-responsive means measuring reaction force exerted on said resisting member by the casing, whereby said reaction force is proportional to the torque transmitted by said first shaft member.

2. A torque-sensing, torque-conversion unit comprising:
   a casing having bearing means disposed therein,
   first and second shaft members mechanically coupled inside said casing for transmission of torque therebetween, the first shaft being journalled in said bearing means for rotation about an axis normal to a first plane,
   first, second and third support members carrying said casing in universal mountings, said mountings lying in a second plane,
   said first support member being constructed to provide universal rocking motion only, without translatory motion,
   said second support member including a first pin member with its axis lying in the first plane, said first pin member being so constructed and arranged as to resist the tendency of rotation of the casing in the first plane in response to rotation of said first shaft member relative to said casing, said first pin member having rounded ends so as to rock and provide relatively frictionless translatory motion of the casing in the second plane, and
   means responsive to the force exerted by the casing on said first pin member for measuring the torque transmitted by the first shaft.

3. The combination according to claim 2 wherein said third support member allows unidirectional translatory motion of the casing parallel to the first shaft and wherein said first plane is perpendicular to said second plane.

4. The combination according to claim 2 wherein said second and third supporting members include second and third pin members respectively oriented parallel to the first shaft and supporting the casing on rounded ends so as to rock and allow both rotary and limited translatory motion of the casing, and wherein said first plane is parallel to said second plane.

5. A torque-sensing, torque-conversion unit comprising:
   a casing having bearing means disposed therein,
   first and second shaft members mechanically coupled in said casing for transmission of torque therebetween, said first shaft being journalled in said bearing means for rotation about an axis normal to a "bearing plane,"
   first, second and third support members carrying said casing in universal mountings, said mountings all lying in a "mounting plane,"
   said first support member holding its mounting in a fixed location and said second and third support members being constructed to allow limited translatory movement of the casing in the "mounting plane,"
   said second support member including a pin disposed with its axis lying in the "bearing plane" and disposed between first and second spaced surfaces defined by a casing portion and the second support member respectively so as to resist the tendency of rotation of the casing in the "bearing plane," in response to rotation of said first shaft member relative to said casing, said pin having rounded ends so as to rock and provide both universal rotary movement and limited translatory movement in the "mounting plane," and
   force-responsive means for measuring the compressive force along the axis of said pin so as to indicate the torque transmitted by the first shaft member.

6. The combination according to claim 5 wherein said force-responsive means includes a strain gage attached to said pin and measuring the deflection thereof under compression.

7. A torque-sensing gear box comprising:
   first and second parallel oppositely-rotating input shafts having bevel gears thereon,
   an output shaft disposed perpendicular to said input shafts and having opposed bevel gears thereon driven by said input bevel gears,
   a gear box including first, second and third bearing means journaling said first, second and third shafts respectively,
   first, second and third support members carrying first, second and third universal mountings respectively disposed in a plane parallel to the third shaft and perpendicular to the first and second shafts, said universal mountings each being connected to the gear box and providing universal rotary motion between the respective support members and the gear box,
   said first support member being fixed and constructed to restrict translatory motion of the first mounting,
   said second support member being constructed to provide unidirectional translatory motion of the second mounting parallel to the third shaft,
   said third support member including a pin supporting a portion of the casing from the support member on rounded ends so as to provide translatory motion in said plane by pivoting on the lower end thereof and universal rotary motion by the casing pivoting on the upper end thereof, and
   a strain gage indicator attached to said pin member for measuring a force proportional to the output torque of the third shaft.

8. A torque-sensing gear box comprising:
   first and second rotating parallel shaft members,
   a plurality of gears coupling said shaft members for transmission of torque therebetween,
   a gear casing containing said gears and having first and second bearing means journaling said shaft members,
   first, second and third support members supporting said gear casing in first, second and third universal mountings respectively lying in a plane parallel to each of said first and second shafts,
   said first support member being constructed to restrict translatory motion of the first mounting,
   said second support member being constructed to allow unidirectional translatory motion of the second mounting in said plane parallel to the axes of the shafts,
   said third support member including a pin member supporting a portion of the gear casing and having rounded ends and being oriented normal to said plane so as to allow limited translatory motion of the gear casing in said plane by pivoting on the lower end thereof and universal rocking motion of the gear casing portion pivoting on the upper end thereof, and a strain gage indicator attached to said pin member and measuring the deflection along the axis of the pin member in compression for indicating a reaction force proportional to the combined reaction torques of the first and second shafts on the gear casing.

9. A torque-sensing gear box comprising:

first and second rotating parallel shafts, gear means coupling said first and second shafts for torque transmission therebetween, a gear casing enclosing said gear means and having first and second bearing means journaling said first and second shafts respectively, first, second and third support members carrying said casing in first, second, and third universal mountings respectively, said mountings all lying in a plane normal to the first and second shafts, said first support member being constructed to resist translatory motion of the first mounting, said second support member including a first pin supporting a portion of the gear casing on rounded ends and disposed normal to said plane so as to allow limited translatory motion in any direction in said plane by pivoting on the lower end thereof, whereby friction forces resisting translation of the gear casing in said plane are substantially reduced, said third support member including a second pin member constructed and oriented in like manner as the first pin member to support the casing and also including a third pin member constructed in like manner but oriented perpendicular to the second pin and lying in said plane so as to resist rotation of the gear casing in said plane, and a strain gage attached to said third pin member and measuring the deflection thereof in compression for indicating a reaction force proportional to the combined reaction torques of the first and second shafts on the gear casing.

10. A universal support member for indicating unidirectional reaction force comprising:

a fixed member defining a first substantially flat bearing surface, a supported member defining a second substantially flat bearing surface parallel and spaced from said first surface, a pin member extending between said surfaces and defining rounded ends bearing against said surfaces, whereby limited motion of the supported member which is substantially translatory can take place by the pin member pivoting on the first surface and limited universal rocking motion of the supported member can take place at the second surface, and a strain gage attached to said pin member to measure deflection proportional to a compressive force along the axis of the pin.

No references cited.

RICHARD C. QUEISSER, *Primary Examiner.*